June 25, 1963   J. G. JACKSON, JR., ETAL   3,095,004
VALVES WITH UPSTREAM-DOWNSTREAM SEALING
Filed Sept. 26, 1961

John G. Jackson, Jr.
Allen F. Rhodes
INVENTORS

BY Carl B. Fox, Jr.
ATTORNEY

United States Patent Office 3,095,004
Patented June 25, 1963

3,095,004
VALVES WITH UPSTREAM-DOWNSTREAM SEALING
John G. Jackson, Jr., Angleton, and Allen F. Rhodes, Houston, Tex., assignors to McEvoy Company, Houston, Tex., a corporation of Texas
Filed Sept. 26, 1961, Ser. No. 140,952
8 Claims. (Cl. 137—246.11)

This invention pertains to automatic sealing valves. The expression "automatic sealing valves" is herein used to include all types of valves, including gate valves and plug valves, wherein the pressure of line fluid flowing through the valve passage is utilized to energize or actuate seals at the gates or other closure of the valve.

A principal object of the invention is to provide valves having dual or alternative sealing means.

Another object of the invention is to provide such valves wherein the dual sealing means is operable in either direction of flow through the valve.

In more particular, it is an object of the invention to provide an automatic sealing valve wherein "upstream" sealing is primarily utilized, but wherein "downstream" sealing is utilized in case of failure of the "upstream" sealing.

Briefly, the invention provides end valves and a sealing arrangement wherein fluid pressure of the fluid, liquid or gas, flowing through the valve are employed to pressure sealing means or to supply sealing material to the seals within the valves. The sealing arrangement is such that pressure at one side of the valve actuates the seal initially, but should the first seal fail, then pressure at another place within the valve actuates or operates a second seal whereby the valve is still effective in operation in spite of failure of the first seal.

Figure 1:
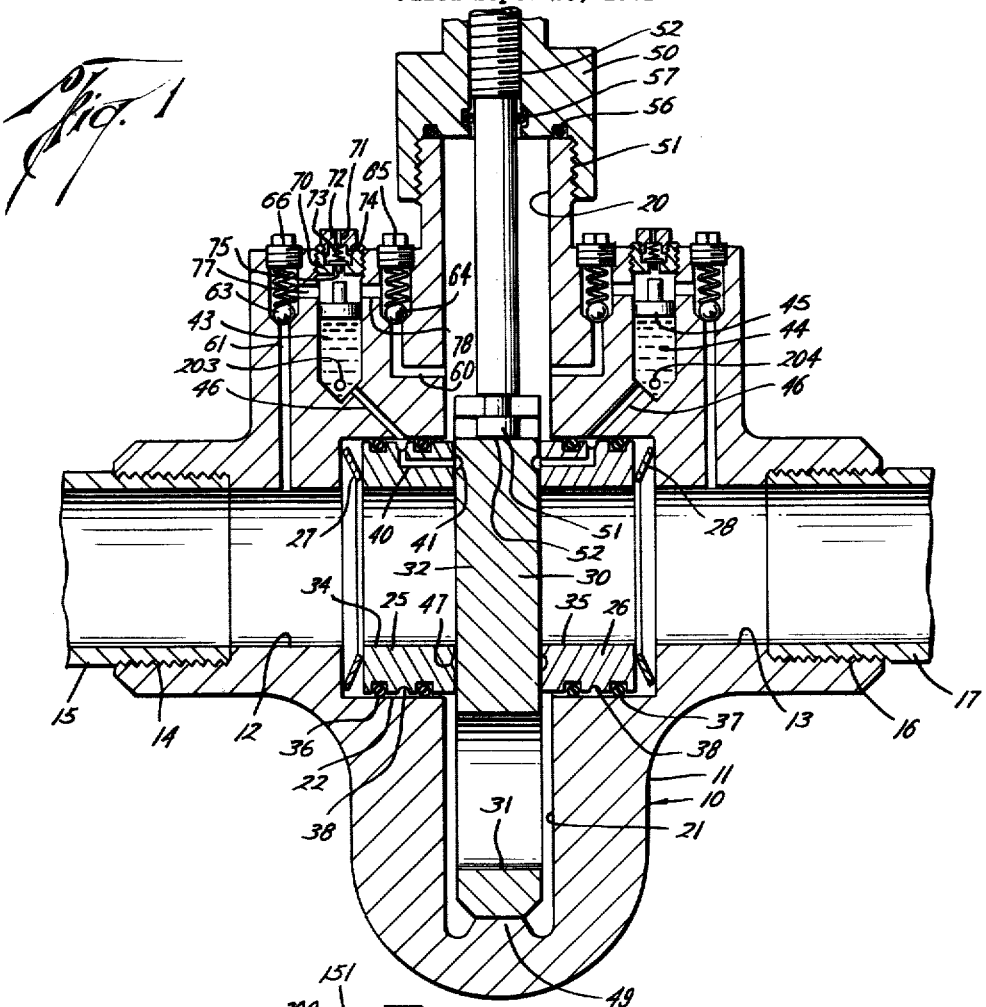
Figure 2:
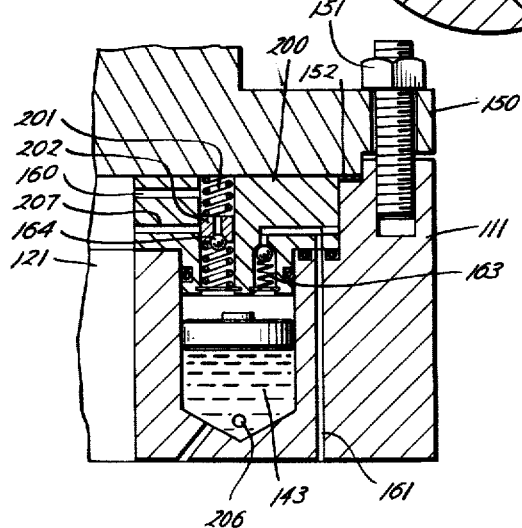

Other objects and advantages of the invention will appear from the following detailed descriptions of preferred embodiments thereof, reference being made to the accompanying drawings, of which:

FIGURE 1 is a vertical axial cross-sectional view of a valve of preferred form according to the invention; and FIGURE 2 is a partial view showing a modified valve, being taken similarly as FIGURE 1.

Referring now to the drawings in detail, and first to the valve shown in FIGURE 1 of the drawings, the valve is referred to generally by reference numeral 10. Valve body 11 of valve 10 has a fluid flow passage therethrough the opposite ends of which are indicated by reference numerals 12 and 13. Passage 12 has threads 14 at its outer end for connection to a flow conduit such as pipe 15. Passage 13 has threads 16 at its outer end for connection of a flow conduit such as pipe 17.

Bonnet opening 20 leads to the valve chamber within the valve body 11. The valve chamber is referred to by reference numeral 21. At opposite sides of the valve chamber and at the inner ends of the passages 12, 13, there are provided circular seat recesses 22, 23, which surround the two passages 12, 13 and are in the form of counterbores around the inner ends of these passages. A seat member or ring 25 is disposed in seat recess 22 and a seat member or ring 26 is disposed in seat recess 23. Springs 27, 28 are disposed behind the seats 25, 26, respectively. Other forms of springs known in the art may be substituted. Springs of the Belleville type are especially suitable since they contact the surface at either side completely therearound. The springs and seats are dimensioned so that the seats protrude somewhat into the valve chamber at either side thereof.

A gate member 30 is disposed between the inner faces of the two seats within the valve chamber. Gate 30 is herein shown for exemplary purposes as a single plate having a port 31 therethrough to permit fluid flow through the valve when port 31 is aligned with passages 12, 13. The upper part of the gate is imperforate at 32 to provide a sealing plate area of the gate. This sealing plate area of the gate when aligned over the inner ends of passages 12, 13, closes the valve.

Each of the seat members 25, 26 is in the form of a ring, the flow ports 34, 35 being formed therethrough in alignment with passages 12, 13 and providing flow continuations therewith. Outwardly therearound, each ring has spaced grooves in each of which an O-ring 36 or 37 is disposed to be in contact with the side of the seat recess. Between the two rings of each seat, there is formed another groove 38 therearound to serve as a sealing groove. An L-shaped port 40 extends from the upper side of each seat to the seating base thereof to provide flow of sealing material past the seat to a jumper or connection groove 41 in the gate face.

Valve body 11 has formed therein two sealing material reservoirs 43, 44, each being formed in the valve body to one side of the valve chamber. The reservoirs are of cylindrical form each having a piston 45 therein. Each piston 45 retains a flowable sealing material therebelow in the reservoir. The pistons are slidably movable in the reservoirs and are acted upon by fluid pressure at their upper surfaces to pressure the sealing material below the pistons. At the lower end of each reservoir there is a port 46 through the valve body leading to a seat recess 22 or 23 at the groove 38 therearound and at the emergence of the L-shaped port 40 of the seat member installed in the seat recess.

The jumper ports 41 in the gate element 30 are preferably in the form of a partial arc to surround the flow port 12 or 13 to which it corresponds. These jumper ports 41 extend only a relatively short distance around the flow port or passage. The remainder of the sealing groove for sealing around the junctures of the flow passages and the gate member at each side of the gate member are in the form of partially circular grooves 47. Each of the partially circular grooves 47 extends to overlap each end of the shorter partial circle grooves 41, so that together, at each side of the gate member, a groove 41 coacts with a groove 47 to form a complete circle groove means around the corresponding valve flow passage when the gate is in closed position.

Within the lower end of valve chamber 21, there is an upstanding formation 49 to limit the downward movement of gate member.

A valve stem 50 has a T-shaped formation 51 at its lower end which fits loosely within a corresponding T-shaped slot in the upper end of the gate member 30. The T-shaped slot in the gate member is identified by reference numeral 52. This connection between the stem end and the gate member allows some "play" so that relative movements between the stem and gate member are provided for. Stem 50 extends upwardly out of the bonnet opening of the valve body and is equipped with a suitable means for providing axial movement of the valve stem to operate the valve. For example, bonnet cap 50 screwed onto the valve body at threads 51 may have threads 52 in which the stem may be moved axially. The rising stem shown may be replaced by a nonrising stem, in which case the stem will be threaded with the gate member and the stem will merely rotate and not move axially.

O-ring seals 56, 57 are provided at the juncture between the bonnet and the valve stem, respectively.

Adjacent each of the reservoirs 43, 44, two passageways or ports are provided through the valve body from the exterior thereof to the interior thereof. At each reservoir, there is provided an L-shaped port 60 which terminates at one end at the valve body exterior and at the other end at the valve chamber above a seat member. The other passageway of port 61 extends from the exterior of the valve body to one of the flow passages 12 or 13. Each of the passages 60, 61 is enlarged at its upper end and has therein a check valve. Check valves 63 are each in the enlarged upper end of a passage 61 and check valves 64 are each in the enlarged upper end of a passage 60. The upper end of each passage 60 is closed by a screwed in plug 65 screwed into appropriate threads in the passage end and each passage 61 is closed at its upper end by a plug 66 screwed into appropriate threads in its upper end. The plugs 65, 66 retain the check valves. The check valves are spring biased by compression springs as shown and the compression springs act at one end against the valves and at the other end against a screwed-in plug or cap. Thus, the check valves are all normally closed and are opened by pressure of fluid beneath the valves. The upper end of each reservoir 43, 44 is closed by a screwed-in plug 70 having a vertical axial port 71 therethrough. Each plug 70 has a screwed-in closure part 72 which may be removed to provide access to a spring-biased relief valve 73 disposed within an enlarged portion 74 of the plug passage 71. Each check valve has a depending downwardly extending rod portion 75 which guides the relief valve disc when it is raised from its seat. Ports 77, 78 communicate between the upper end of the reservoir and each of the check valves 63, 64.

Each of the ports 60 admits valve chamber pressure to the lower side of a check valve 64 which, when the valve chamber pressure becomes sufficient, is lifted off the seat to permit pressure to act on the upper side of a reservoir piston. Each port 61 admits pressure from one of the flow lines to the lower side of a check valve 63 which, when the pressure becomes sufficient, is lifted off of its seat to admit the pressure to enter the upper end of the reservoir through a passage 77.

The valve of FIGURE 1 which has just been described is primarily an "upstream" sealing valve. By "upstream" sealing, it is meant that the gate is sealed around at the high-pressure side. The valve is reversible, and can seal against pressure fluid flowing therethrough in either direction. To exemplify the valve operation, suppose that a higher pressure is in valve passage 12 and a lower pressure is in valve passage 13. The higher pressure fluid in passage 12 will enter through the port 61 at that side of the valve and cause check valve 63 to be opened so that the higher pressure enters the upper end of the reservoir 43. Sealing material below the piston in the reservoir will be pressured by the pressure acting at the upper side of the reservoir and sealing material will commence to flow through the passage 46, the passage 40, and thence into jumper groove 41 and groove 47. Flow of sealing material into this groove will cause a seal to be formed at once. Once the seal commences to form, the higher pressure fluid in passage 12 will be sealed off from the interior of the valve chamber and will act against the seat member 25 at the location of the Belleville spring 27 to cause the seat member to move toward the gate to increase the effectiveness of the seal. No seal will initially be formed at the other, or passage 13, side of the valve because the valve chamber and the flow line are under the same pressure, as is also the sealing groove. However, should a seal fail to be effectively formed at the passage 12 side of the gate, then the high pressure will leak into the valve chamber and urge the gate member toward the passage 13 seat 26. Then, higher pressure will be in the valve chamber than in the low-pressure side of the valve in pasage 13, and the high pressure will enter the L-shaped port 60 to unseat the check valve 64 and pressure the reservoir piston downwardly to cause sealing material to flow through the ports 46, 40 and into the sealing grooves around the flow passage at the downstream side of the valve. Thus, failure of the upstream seal will result in the effective sealing by a downstream seal.

Referring now to FIGURE 2 of the drawings, in the modification of the valve shown the valve body 111 has a reservoir 143 formed therein which may be to either side of the valve chamber 121. A bonnet 150 is secured to the valve body 111 by a plurality of the bolts 151. A seal around the bonnet is provided by steel ring gasket 152. Comparing the FIGURE 2 modification element by element with the FIGURE 1 embodiment, spring bias check valve 163 corresponds to check valve 63, spring bias check valve 164 corresponds to check valve 64, port 161 corresponds to port 61, port 160 corresponds to port 60. These check valves and ports are disposed through a removable plug 200 which is seated around the upper end of the reservoir against the valve body and below the bonnet which holds the removable member in place. A spring 201 and ported plug 202 which are disposed in the cylindrical opening of valve 164 and thereabove, constitute a valve corresponding to valve 74 of the FIGURE 1 embodiment. It will be understood that the showing of FIGURE 2 will be repeated at the other side of the valve chamber and above the other flow passage of the valve. Port 161 leads to the flow line through the valve and port 160, as shown, opens into the valve chamber. Pressure in the flow line valve passage will enter through port 161 and unseat check valve 163 while pressure from the valve chamber will enter through port 160 and cause unseating of check valve 164. Thus, initial upstream sealing and downstream sealing, in case the upstream sealing fails, will take effect in the FIGURE 2 valve as well as in the FIGURE 1 valve.

Referring now to both FIGURES 1 and 2, in the FIGURE 1 embodiment the valve shown has reservoir filler ports 203, 204 each leading to the lower end of one of the reservoirs through the valve body. The reservoirs are filled with sealing material by injection of same through these filler ports beneath the pistons whenever the supply of sealing material needs replenishing. The exterior injection fittings are not indicated in the drawings but are common in the type of valve contemplated and will be known to those skilled in the art. When sealing material is introduced into a reservoir, for example, reservoir 43 of the FIGURE 1 embodiment, the piston rises in the reservoir until it reaches the top thereof. In so doing, since the check valves 63, 64 are both biased to close by a pressure above the reservoir piston, relief valve 74 is provided for relief of this pressure in case it becomes too great. When sealant is introduced to reservoir 43 through port 203, the piston gradually rises and compresses the fluid in the reservoir above the piston and when that fluid reaches a certain predetermined pressure, depending on the characteristics of check valve 74, the pressure will be relieved by outflow of fluid through the valve 74.

The operation of relieving excess pressure above the piston when sealing compound (sealant) is injected into a reservoir can alternatively be performed manually, with omission of the relief valve at the upper end of the reservoir. In such case, instead of relief valve 74 of FIGURE 1 or its counterpart of FIGURE 2, the upper end of the reservoir will be closed by a plug, or the like. As sealant is injected into the lower end of the reservoir below the piston, pressure in excess of line fluid pressure will be built up in the reservoir above the piston due to sealant inflow and upward movement of the piston in the reservoir, this pressure also existing in the sealant below the piston, and usually indicated by a suitable gauge at the sealant injection tool. When the reservoir pressure has in this manner become excessive, or reached a predetermined magnitude, it can be relieved by manually loosening the threaded plug or other closure at the top of the reservoir to bleed the excess pressure therefrom. In the case of a threaded plug, loosening of the plug will permit leakage at the threads to relieve the pressure. This would usually require about one revolution of the plug and would not disengage the plug. When the pressure in the reservoir has been sufficiently relieved, as also indicated at the sealant injection tool, the plug or other closure is tightened to again close the top of the reservoir.

In the FIGURE 2 modification, plug member 202 is acted upon by pressure above the piston when the reservoir is filled through port 206 and will move upwardly against spring 201 to relieve the reservoir pressure above the piston through a port 207 into the valve chamber. Thus, in the FIGURE 2 modification, check valve 164 utilizes plug 202 as its seat and plug 202 itself serves as a check valve in the opposite direction for providing filling up the reservoir.

While preferred embodiments of the invention have been shown and described, many modifications thereof may be made by a person skilled in the art without departing from the spirit of the invention, and it is intended to protect by Letters Patent all forms of the invention falling within the scope of the following claims.

We claim:
1. Gate valve of the internal pressure automatic sealing type, comprising a body having flow passage means therethrough and an internal valve chamber therewithin intermediate the length of said flow passage, valve closure means disposed in said chamber for closing said flow passage means, means for moving said closure means between open and closed positions with respect to said flow passage from the exterior of said body, sealing means within said body for sealing around said flow passage means at said closure means when said closure means is in said closed position with respect to said flow passage, sealant reservoir means having sealant flow communication means therefrom to said sealing means, means for controlled admission of fluid pressure from said flow passage means to pressure sealant in said reservoir means, means for controlled admission of fluid pressure from said chamber to pressure sealant in said reservoir means.

2. In a valve having a body means including a line fluid flow passage through said body means and a valve chamber within said body means intermediate the length of said line fluid flow passage, said valve being of a type including internal fluid presure actuation of sealing means, wherein sealant reservoir means is provided for delivering sealant to seal areas when pressured, the improvement comprising first pressure port means from said reservoir means to the line fluid flow passage through the valve, second pressure port means from said reservoir to the valve chamber, and means for controlling admittance of pressure to said reservoir through each of said first and second pressure port means.

3. Combination of claim 2, including pressure relief means for venting excess pressure from said reservoir.

4. Gate valve of the internal pressure automatic sealing type, comprising a body having flow passage means therethrough and an internal valve chamber therewithin intermediate the length of said flow passage, valve closure means disposed in said chamber for closing said flow passage means, means for moving said closure means between open and closed positions with respect to said flow passage from the exterior of said body, sealing means within said body for sealing around said flow passage means at said closure means when said closure means is in said closed position with respect to said flow passage, sealant reservoir means having sealant flow communication means therefrom to said sealing means, means including check valve means for admitting fluid pressure from said flow passage means to pressure sealant in said reservoir means, means including check valve means for admitting fluid pressure from said chamber to pressure sealant in said reservoir means.

5. Combination of claim 4, including means for introducing sealant into said reservoir from the exterior of said body, and means for venting excessive fluid pressure from said reservoir above said sealant.

6. Valve, comprising a valve body having a line flow passage therethrough with conduit connection means at each end thereof, a valve chamber within said body intermediate the length of said flow passage and having a bonnet opening at the exterior of said body, a bonnet closure secured to said body closing said bonnet opening, ported line flow passage closure means within said chamber movable by stem means extending through said bonnet closure between open and closed positions with respect to fluid through said line flow passage, two sealant reservoirs internally of said body one at each side of said closure means, port and sealing groove means connected at the lower part of each said reservoir each for providing a seal at one side of said closure means, a piston slidingly and sealingly movable in each said reservoir, sealant in each said reservoir below the piston, sealant admitting means in each said reservoir below the lower extent of movement of said piston therein, first pressure port means from the upper part of each reservoir above the piston to the line flow passage part at its side of said closure means including check valve means permitting fluid flow from the flow passage to the reservoir but preventing fluid flow in the opposite direction, second pressure port means from the upper part of each reservoir above the piston to the valve chamber including check valve means permitting fluid flow from the chamber to the reservoir but preventing fluid flow in the opposite direction, and a venting port from the upper part of each reservoir above the piston permitting excess pressure flow from the reservoir.

7. Combination of claim 6, said first and second pressure port means and said venting port being disposed through the valve body.

8. Combination of claim 6, said first and second pressure port means and said venting port being at least partly disposed through a closure for the upper end of each reservoir.

References Cited in the file of this patent
UNITED STATES PATENTS

| | | |
|---|---|---|
| 2,868,221 | Eichenberg et al. | Jan. 13, 1959 |
| 2,869,574 | Volpin | Jan. 20, 1959 |
| 2,956,580 | Heath | Oct. 18, 1960 |
| 2,957,492 | Volpin | Oct. 25, 1960 |

UNITED STATES PATENT OFFICE

CERTIFICATE OF CORRECTION

Patent No. 3,095,004            June 25, 1963

John G. Jackson, Jr., et al.

It is hereby certified that error appears in the above numbered patent requiring correction and that the said Letters Patent should read as corrected below.

Column 6, line 23, after "fluid" insert -- flow --.

Signed and sealed this 21st day of January 1964.

(SEAL)
Attest:
ERNEST W. SWIDER

Attesting Officer

EDWIN L. REYNOLDS

Acting Commissioner of Patents